April 14, 1953 R. B. FARMER 2,634,437
POWER DRIVE ADAPTER FOR PIPE THREADERS
Filed March 12, 1951 2 SHEETS—SHEET 1

INVENTOR.
ROBERT B. FARMER
BY
Cook + Robinson
ATTORNEYS

April 14, 1953     R. B. FARMER     2,634,437
POWER DRIVE ADAPTER FOR PIPE THREADERS
Filed March 12, 1951     2 SHEETS—SHEET 2
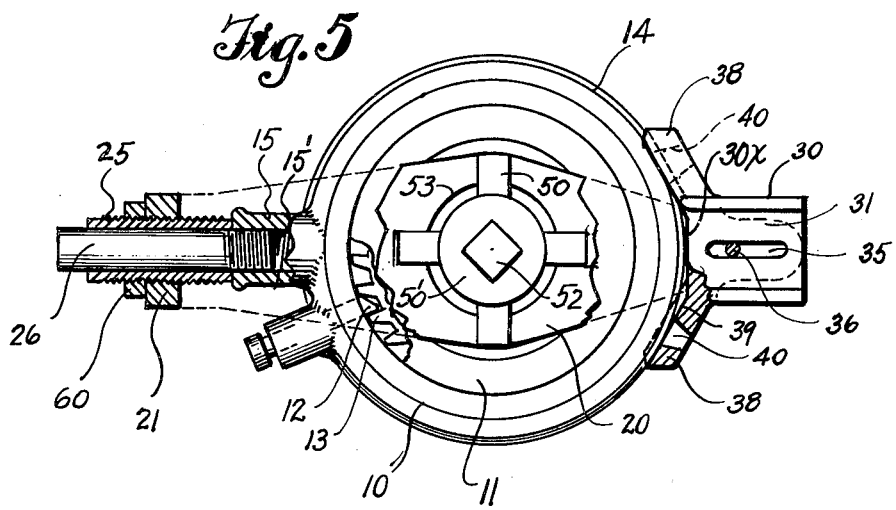
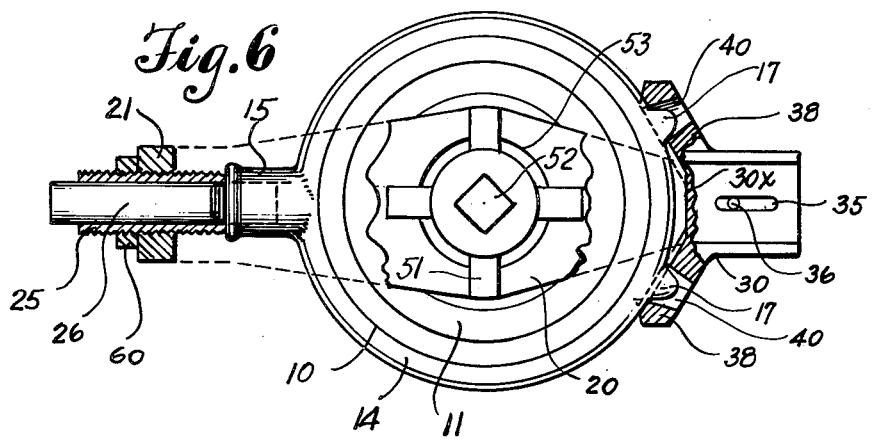
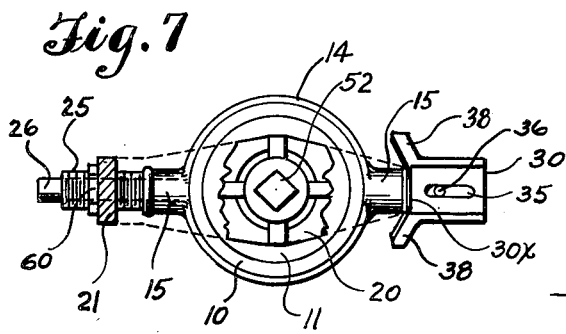
INVENTOR.
ROBERT B. FARMER
BY
Cook + Robinson
ATTORNEYS Patented Apr. 14, 1953

2,634,437

UNITED STATES PATENT OFFICE 2,634,437

POWER DRIVE ADAPTER FOR PIPE THREADERS

Robert B. Farmer, Seattle, Wash.

Application March 12, 1951, Serial No. 215,144

3 Claims. (Cl. 10—123)

This invention relates to pipe threaders. More particularly it has reference to improvements in "adapters" whereby present day power drives may be made applicable to and used for driving many of the present day ratchet type and hand turned thread cutters.

For a better understanding of my invention, it will here be explained that, at the present time, there are several different makes of thread cutters in general and extensive use. Among these may be named those sold under the trade names of "Toledo," "Beaver," "Ridgid," "Nye" and "Oster." Furthermore, each of the manufacturers of these various makes of cutters supply the trade with several different models. But in all instances, the devices are similar in mode of use and have certain structural characteristics in common, which is of significance to the application and use of the present adapter.

It may also be explained that while these various makes and models of thread cutters are primarily designed for manual turning through the mediacy of a handle or handles, there are various kinds or makes of power units or power drives applicable thereto for their mechanical operation. It is required however, that the attachment of a power unit or power drive to the thread cutter be made through the use of an "adapter." Typical present day adapters are made in the form of a wide yoke, to be applied diametrically across the threader body, or die holder, and the legs at its opposite ends secured to the body at opposite sides. The yoke also is equipped with a squared turning shank at such location that it will extend coaxially of the die holder when the yoke is applied to the threader, and to which shank the power device may be applied for turning the die holder to cut the thread.

Heretofore, the use of power drives has been an expense and an annoyance to workmen, by reason of the fact that the various models and various makes of threaders with which the modern shop or systematic workman is equipped, require adapter yokes of different kinds for the connection thereto of the power drive. Yokes that fit one make of threader do not, as a rule, fit any other make, and in some instances do not fit the different models of the same make of device. This condition has made it necessary, if a power drive is to be employed, to supply the workman with several and various kinds and types of adapter yokes.

In view of the above explained situation, it has been the principal object of this invention to provide an improved type of adapter yoke whereby a driving connection can be made between a threader and power drive; and which yoke is easily adaptable to practically all of the present day popular makes and models of thread cutters.

More specifically stated, the present invention has for its object to provide an adapter, comprising a yoke, equipped at its opposite ends with adjustable mountings of clamping character, that make it possible to operatively fit and secure the yoke to a majority of the various models of all the popular and currently used thread cutters, both ratchet type and two handle types.

Other objects of the invention reside in the details of construction of parts of the yoke; in their combination, relationship and in the mode of application and use of the yoke on the threader, as will hereinafter be fully described.

In accomplishing the above mentioned and other objects of the invention, I have provided the improved details of construction, the preferred forms of which are illustrated in the accompanying drawings, wherein—

Fig. 5 is an end view of a pipe threader, showing partly in dotted lines and partly in sectional detail, the application and securement of the present adapter thereto.

Fig. 6 is a similar view showing a threader of an alternative form and the application of the clamping elements of the adapter thereto.

Fig. 7 is a view illustrating the application of the adapter to another form of threader.

Referring more in detail to the drawings—

Figure 1:
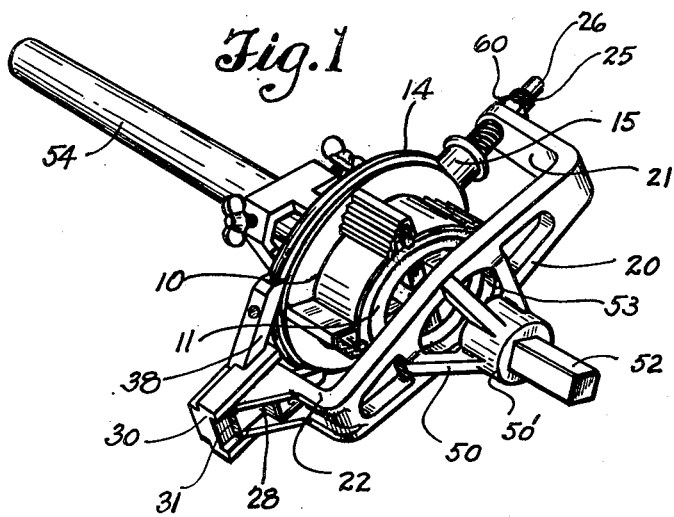
Fig. 1 is a perspective view of the present "adapter" as applied to a pipe threader that is typical of present day types.

In Fig. 1, I have shown a present day pipe threader of the hand turned, ratchet type that is typical of those various kinds with which the present form of adapter may be used. The pipe threader comprises a cast metal body 10 in which a die head 11 is rotatably contained. The body is substantially circular and it mounts therein a ratchet pawl, as indicated in Fig. 5, at 12, that coacts with the ratchet teeth or notches 13 that are embodied in or formed as a part of the die head.

The body 10 is encircled by an integral flange 14 that lies in a plane that is perpendicular to the axial line of the body and die holder. Projecting outwardly from this flange, at one side of the body, is a boss 15 formed with a socket 15' into which a handle bar may be threaded for the hand turning of the body and die holder for a thread cutting operation. In the present showing of the thread cutter, in Figs. 1, 5 and 6, the handle has not been shown because of the necessity of its being removed for the application of the adapter.

It will further be explained here that the bodies 10 of some of the ratchet types of threaders are formed, at the side opposite the boss 15, with two spaced, protuberances, or lugs 17—17, as seen in Fig. 6, which may serve as supports to keep the threader from rolling when laid on a bench or floor. The existence of these lugs has been given consideration in the design of the present adapter. Also, it will be here noted that in threaders of some models of the various makes on the market, two large socketed, bosses 15—15 are provided at diametrically opposite sides of the body 10 to receive handles as has been shown in Fig. 7; this usually being the case when a ratchet mechanism is not employed in the tool. Such threaders do not have the lugs 17—17 projecting therefrom.

While the different makes of threaders may vary somewhat in design and in body diameter, they all have the following features of construction in common: the bodies 10 are circular; each has an encircling flange corresponding to flange 14 and each has at least one socketed boss 15 extending from the flange 12 at a side of the body for reception of a handle; the bosses are all adapted to receive handles of the same diameter.

The present adapter, by reason of its details of construction, is readily applicable to bodies of different diameters within a definite range, and may be readily applied to those equipped with one or two of the socketed bosses 15 to which handles may be applied as well as to bodies that have the lugs 17—17 found thereon.

Figure 2:
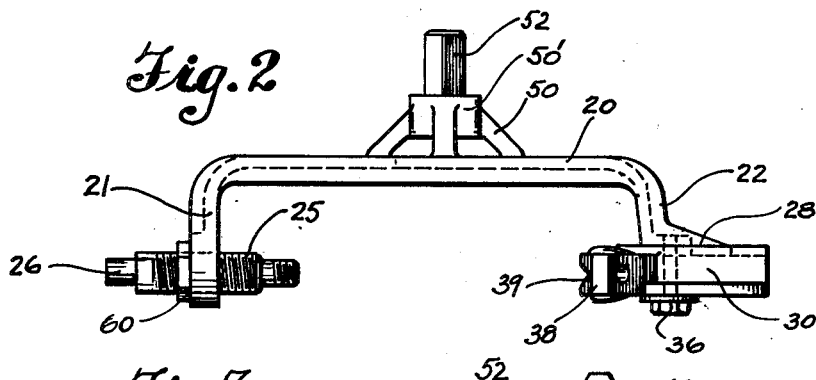
Fig. 2 is a side view of the adapter.
Figure 3:
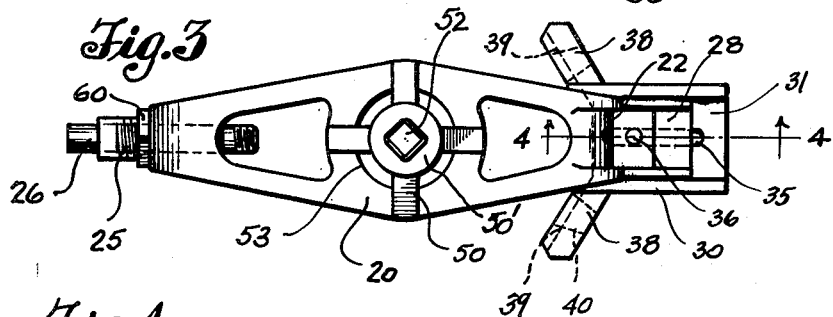
Fig. 3 is a top or plan view of the same.

As seen best in Figs. 1 and 3, the present yoke, comprises a flat, cast metal cross bar 20, with integrally formed legs 21 and 22 at its opposite ends; each being directed at a right angle to the plane of bar 20 and both extend in the same direction. Mounted in the leg 21 near its lower end in reference to its showing in Fig. 2, is a cylindrical sleeve 25; this being threaded through the leg for its easy endwise adjustment. The sleeve, which comprises a short piece of pipe, is open at its ends and is adapted to slidably receive a pipe nipple or shaft therethrough, such a nipple being herein designated by numeral 26.

At its lower end, the leg 22 is formed with a foot 28, that extends outwardly from the leg and is formed with a flat bottom surface that lies in a plane parallel to the plane of the under face of the cross bar 20. Adjustably fitted to the flat under face of the shoe, is a clamp member 30. This member is in the form of a flat plate, formed in its top face with a guide channel 31 in which the foot is contained for guided adjustment of the clamp member thereon directly toward or from the opposite leg of the yoke.

Figure 4:
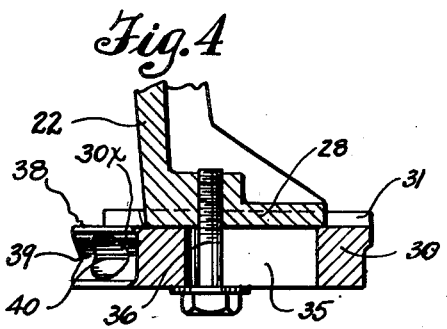
Fig. 4 is an enlarged sectional detail taken on line 4—4 in Fig. 3.

The clamp member 30 is formed with a longitudinal slot 35 through which a clamp bolt 36 is extended, and threaded into the foot 28 as best shown in Fig. 4. When the bolt is loosened the clamp member 30 may be adjusted toward or from the leg 21. When the head of the clamp bolt is tightened against the plate, the latter will be secured at set position of adjustment.

At its inner end, the clamp member 30 is formed at opposite sides with two laterally directed and angularly diverging arms 38—38. These arms are longitudinally grooved in their inside faces, as at 39, for fitting or seating the flange 14 therein when the adapter is applied to the body 10 as presently explained. The groove surfaces of these arms are formed with sockets 40—40, spaced at the same distance that the lugs 17—17 are spaced on the flange 14, as understood by reference to Fig. 6. Also between the base ends of the arms is a flat surface 30x.

Cast with the cross bar 20, as well shown in Fig. 2, is an upstanding spider 50 having a central hub portion 50' in which a squared shank or stub shaft 52 is secured as a turning means for the adapter yoke; it being understood that in the use of the adapter, a power drive device is applied to the shank. Such power devices are well known in the industry and none has been illustrated in detail in the present drawings. As a detail of construction, the bar 20 has an opening 53 formed therein beneath the spider so that the threader can be advanced to a greater distance on the pipe. This will be understood by reference to Fig. 1 wherein a piece of pipe, to which the threader is applied, is designated by numeral 54.

With the adapter yoke so constructed, it is applied and used as follows: Assuming that the piece of pipe to be threaded is held in a vise, or is otherwise suitably supported, the pipe threader, with the usual handle removed therefrom, is applied to the end of the pipe as illustrated in Fig. 1. Then the adapter is fitted to the threader and secured.

To prepare the adapter for application, the relatively short pipe nipple 26 is applied through the sleeve 25; this latter being threaded through the yoke leg 21. It is observed that the nipple 26 is threaded at its inner end for its threaded application to the socketed boss 15. Also, that it is somewhat longer than the sleeve 25, as will be understood by reference to Fig. 2, and extends from the ends of the sleeve.

The yoke is then applied diametrically across the body 10 and die holder, as in Fig. 1, and the leg 21 thereof brought to position just outside of the outer end of the handle boss 15. Then the nipple 26 is threaded at its inner end into the boss socket, and the yoke shifted inwardly to seat the inner end of the sleeve 25 against the boss as in Fig. 5. It is to be understood that the adjustability of the sleeve 25 and clamp plate 30 provides that the yoke can be moved endwise as may be required to bring the turning shank 52 substantially into coaxial alignment with the body 10 and die holders.

The clamp member 30, which previously had been released for adjustment, and moved to the outer end of foot 28, is now moved inwardly to cause the diverging arms 38—38 of the member to be seated against the body flange 14 as shown in Fig. 5; the flange 14 being received and seated in the V-shaped grooves 39—39 that are formed along the inner surfaces of the arms. Then the bolt 36 is tightened against the clamp plate to secure it against outward slippage on the foot. Following this, the sleeve 25 may be additionally tightened against the outer end of boss 15, and secured against release by a lock nut 60 which is threaded onto the sleeve 25 for tightening against leg 21. With the yoke so secured to the threader, the power drive, whatever kind it may be, can be functionally applied to the shank 52 for the rotation of the threader.

In the event that the threader body 10 is of that kind having the lugs 17—17 cast on its periphery as noted in Fig. 6, the clamp plate is so located that these lugs will be received in the sockets 40—40 of the diverging arms 38—38 and provide additional security for the yoke.

If the threader body 10 is of that type seen in Fig. 7, that is, equipped with two socketed bosses 15—15, located at opposite sides of the body for reception of handles, then the adapter yoke is applied to this body by first applying, to one of these bosses, the nipple 26 and sleeve 25 as previously explained, and then seating the flat inner end face 30x of the clamp plate 30 directly against the end of the other socketed boss, between the base ends of the diverging arms. Then the sleeve 25 is tightened and the adapter will be held secure. Thus, while the present adapter yoke is intended primarily for use with threaders that are of the single handle ratchet type shown in Fig. 1, it may be readily adapted for use with the two handle types, as in Fig. 7, and will operate as effectively therewith.

The adjustability of the sleeve 25 and clamp member 30 permits the yoke to be applied to threaders of a wide range of diameters, and the clamp member, by the provision of the diverging arms, with channeled and socketed inner faces, makes it possible to secure the yoke to the various ratchet types as well as the various two handle types.

By provision of the present adapter, any of the present day popular power drives can be used with substantially all models and makes of pipe threaders and the need for the great variety of adapters is eliminated.

Having thus described my invention, what I claim as new therein and desire to secure by Letters Patent, is:

1. A power drive adapter for pipe threaders of those types which comprise a die housing formed with an encircling outwardly projecting flange and a handle socket extending from the housing outwardly beyond the flange; said adapter comprising a yoke-like member having a base bar adapted to be disposed diametrically across the outer end of the die housing and legs at the ends of the base bar to extend along opposite sides of the housing; one of said legs having a clamping member adjustably mounted thereon for seating against the housing flange, the other leg having a tubular clamping member threaded therethrough in a direction radially of the threader to seat upon and be tightened against the outer end of said handle socket, a nipple slidably extended through said tubular clamping member for securement in said handle socket as a retainer for the tubular member; and a turning shank extending from the base bar of the yoke.

2. A power drive adapter for pipe threaders of those types comprising a housing that is formed with an encircling, outwardly directed flange and with a radially directed handle socket located in the plane of the flange and extending therefrom at one side of the housing; said yoke comprising a base bar adapted to be disposed diametrically across the housing at one end of the threader, and legs at the ends of the base bar to extend along opposite sides of the housing, one of said legs terminating in an out-turned foot, a shoe slidably mounted on said foot for adjustment toward and from the opposite leg, a clamp bolt applied to the foot and shoe for fixedly securing the shoe to the foot at any position of its adjustment, arms extending in divergence from the shoe to tangentially engage the housing flange and having grooves formed therealong to seat the flange therein; the other leg of the yoke having a tubular clamping member threaded therethrough in a direction radially of the housing and a nipple slidably contained therein; said nipple being adapted to be threaded at its inner end into the handle socket and said tubular member being adapted to be guided by the nipple and to be tightened against the end of the handle socket member thus to coact with the shoe to clamp and secure the yoke on the housing, and said yoke having a turning shank extended therefrom at a point intermediate its ends and adapted to be substantially axially aligned with the threader through adjustments of the shoe and said tubular clamping member.

3. An adapter as in claim 2 wherein said base bar has an opening therein adapted to be brought into axial alignment with the threader for the passing thereinto of the pipe being threaded, and wherein said turning shank is supported by a spider that is formed on and outset from the bar in axial alignment with the opening.

ROBERT B. FARMER.

References Cited in the file of this patent

UNITED STATES PATENTS

| Number | Name | Date |
|---|---|---|
| 992,973 | Monie | May 23, 1911 |
| 1,521,194 | Johnson | Dec. 30, 1924 |
| 1,882,462 | Weber | Oct. 11, 1932 |
| 2,266,507 | Neumann | Dec. 16, 1941 |
| 2,289,850 | Matter | July 14, 1942 |
| 2,420,002 | McKay | May 6, 1947 |